(12) United States Patent
Grigoriev et al.

(10) Patent No.: US 10,354,097 B2
(45) Date of Patent: Jul. 16, 2019

(54) CONTEXT SENSITIVE CONCEALMENT OF AN INPUT FIELD

(75) Inventors: Nikolai Grigoriev, Brossard (CA); Haraldur Thorkelsson, Montréal (CA); Natalie Jhaveri, Montreal (CA)

(73) Assignee: NOKIA TECHNOLOGIES OY, Espoo (FI)

( * ) Notice: Subject to any disclaimer, the term of this patent is extended or adjusted under 35 U.S.C. 154(b) by 903 days.

(21) Appl. No.: 12/093,606

(22) PCT Filed: Nov. 14, 2006

(86) PCT No.: PCT/CA2006/001850
§ 371 (c)(1),
(2), (4) Date: May 21, 2008

(87) PCT Pub. No.: WO2007/068082
PCT Pub. Date: Jun. 21, 2007

(65) Prior Publication Data
US 2008/0229230 A1 Sep. 18, 2008

Related U.S. Application Data

(60) Provisional application No. 60/735,810, filed on Nov. 14, 2005.

(30) Foreign Application Priority Data

Nov. 14, 2005 (CA) ..................................... 2526818

(51) Int. Cl.
*G06F 3/048* (2013.01)
*G06F 21/83* (2013.01)
(Continued)

(52) U.S. Cl.
CPC .............. *G06F 21/83* (2013.01); *G06F 21/82* (2013.01); *G06F 21/84* (2013.01)

(58) Field of Classification Search
CPC .......... G06F 3/048; G06F 3/023; G06F 21/82; G06F 21/84
(Continued)

(56) References Cited

U.S. PATENT DOCUMENTS 5,977,887 A 11/1999 Grimmett
5,991,396 A 11/1999 Salm et al.
(Continued)

FOREIGN PATENT DOCUMENTS

JP 2001166843 6/2001
JP 2004021560 1/2004
(Continued)

OTHER PUBLICATIONS

International Search Report for Application No. PCT/CA2006/001850 dated Feb. 1, 2007.
(Continued)

*Primary Examiner* — Andrea C Leggett
(74) *Attorney, Agent, or Firm* — Alston & Bird LLP

(57) ABSTRACT

A method for concealing and revealing sensitive data on an electronic communications device is disclosed. The electronic communications device comprises a plurality of keys, a display upon which a series of characters are adapted to be displayed, the series of characters forming a character string and composed by input operation of a subset of the plurality of Keys, and a processor for implementing at least one module that includes at least one security component. The module i) receives the series of characters during an entry period, the series of characters forming a character string, the entry period comprised of at least one activity period during which the character string is displayed and one inactivity period during which the character string is obscured, ii) detects an inactivity event during the at least one activity period, the activity period ending when the
(Continued)

inactivity event has been detected and iii) detects an activity event during the at least one inactivity period, the inactivity period ending when the activity event has been detected. The module may also iv) detect a completion of composition event, the entry period ending when the composition completion event has been detected and v) conceal permanently the character string after the entry period ends.

38 Claims, 7 Drawing Sheets

(51) Int. Cl.
 *G06F 21/82* (2013.01)
 *G06F 21/84* (2013.01)
(58) Field of Classification Search
 USPC .................................................. 715/780, 764
 See application file for complete search history.

(56) References Cited

U.S. PATENT DOCUMENTS

| | | | |
|---|---|---|---|
| 6,304,261 B1 | 10/2001 | Shields et al. | |
| 6,366,302 B1 | 4/2002 | Crosby et al. | |
| 6,744,422 B1 | 6/2004 | Schillings et al. | |
| 6,747,676 B2 | 6/2004 | Botz et al. | |
| 7,114,077 B2 | 9/2006 | Miller et al. | |
| 7,216,292 B1* | 5/2007 | Snapper et al. | 715/236 |
| 7,808,480 B2* | 10/2010 | Gross | 345/163 |
| 2002/0070964 A1 | 6/2002 | Botz et al. | |
| 2002/0122591 A1 | 9/2002 | Miller et al. | |
| 2005/0015604 A1 | 1/2005 | Sundararajan et al. | |
| 2005/0125698 A1* | 6/2005 | Yeates et al. | 713/202 |
| 2005/0182741 A1 | 8/2005 | Grossman et al. | |
| 2006/0033718 A1 | 2/2006 | Griffin | |
| 2006/0036953 A1* | 2/2006 | Rosar | 715/741 |
| 2006/0085761 A1* | 4/2006 | Allen | G06F 17/243 715/780 |

FOREIGN PATENT DOCUMENTS

| | | |
|---|---|---|
| JP | 2004-220213 | 8/2004 |
| JP | 2004220213 | 8/2004 |
| JP | 2005-216214 | 8/2005 |

OTHER PUBLICATIONS

International Preliminary Report on Patentability for Application No. PCT/CA2006/001850 dated May 14, 2008.
Japanese Office Action from Japanese Application No. 2008-539202, dated Mar. 5, 2012.
Office Action for Canadian Application No. 2,627,172; dated Jul. 29, 2013.
Office Action for European Application No. 06 846 909.7 dated Jun. 25, 2014.
Office Action from Canadian Patent Application No. 2,627,172, dated Feb. 18, 2015.
Supplementary European Search Report for Application No. EP 06 84 6909 dated Dec. 14, 2010.

\* cited by examiner

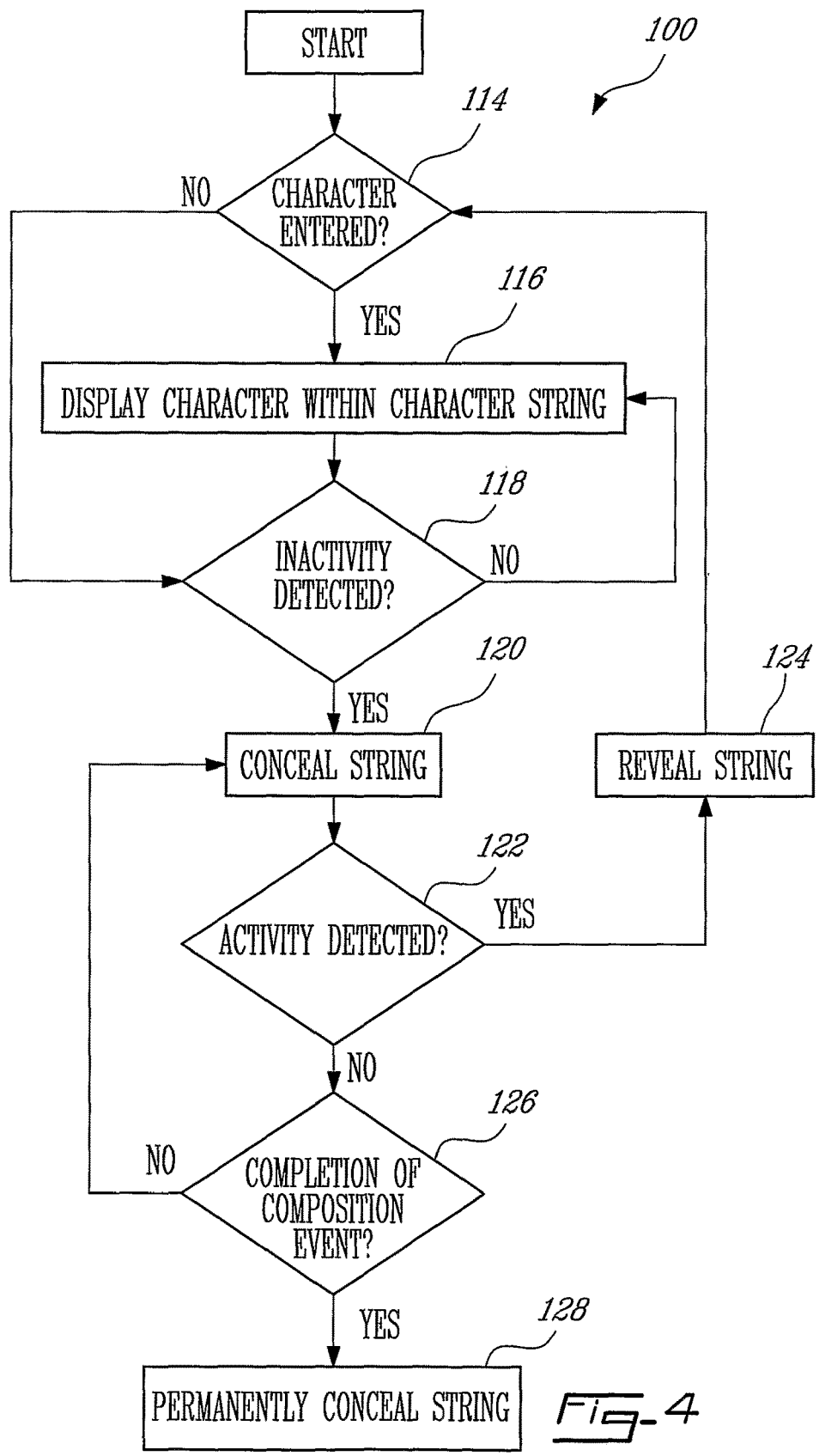

CONTEXT SENSITIVE CONCEALMENT OF AN INPUT FIELD

FIELD OF THE INVENTION

The disclosure relates to a method for the context sensitive concealment of an input field and, in particular, to a method for concealing and revealing sensitive data, especially on mobile devices.

BACKGROUND TO THE INVENTION

As known in the art, entry of alphanumeric characters on devices equipped with a standard twelve (12) key mobile device keypad typically involves either pressing multiple keys (chording) or tapping (actuating) a key multiple times (multi-tap) to select, or compose, a given alphanumeric character. Those skilled will appreciate that for the multi-tap method, a short delay (referred to hereinafter as a "composition timeout") is provided during within which if the same key is pressed, the alphanumeric character displayed is replaced by the next character. The composition timeout is typically fairly short, on the order of one second, for example. Failure to enter a tap on the same key during the composition timeout leads to the currently displayed character being seized by the device and fixed on the display.

In many applications involving the entry of sensitive data such as passwords, the input field is masked or otherwise concealed during input such that the actual input remains invisible, effectively proscribing another's ability to read sensitive data from the input field. In a traditional environment where a complete keyboard is provided, this type of concealment is generally adequate and poses little problem (although, as will be seen below, this also has drawbacks). In a system using the multi-tap method, however, where a certain amount of visual feedback is required to ensure that the correct character is keyed, complete concealment of the character in question proves problematic and typically leads to many false entries, especially when the user's attention during entry is not sufficiently focused on the task at hand. This can prove particularly inefficient when entering passwords as many systems refuse access after a small number of incorrect entries to prevent password discovery by a brute force, trial and error approach.

One example prior art method for concealing characters and even entire input fields during multi-tap entry is as follows. As characters are composed, they are made visible to the user in clear text. For example, in order to compose the character "c" the user taps key number 2 thrice, first revealing the character "a" followed by "b" and arriving at "c" on the third tap. Once the wished for character has been composed and seized by the device, the character displayed is concealed, or masked, by replacing it with a wildcard character such as, for example, an asterisk. Once the character has been concealed in this fashion however, there is generally no way that the user can view it again. Additionally, and as will be understood by a person of skill in the art, as further characters are entered and concealed in this fashion, there is generally no way that the user can view any (or all) of these characters (as they are masked, again typically with an asterisk).

Additionally, due to the variety of input modes that exist on many mobile handsets (for example lowercase mode, uppercase mode, symbol mode, numeric mode, title case mode, etc. which can be switched between by, for instance, user interaction with a selection list generated by soft Key selection) users frequently enter unexpected or unwanted characters because they think the device is in one particular mode, when in fact, the device is in a different mode. For example, in title case mode where the first letter in a string is capitalized, the user may easily enter "Password" instead of "password" without noticing it. As passwords are typically case-sensitive this can lead to a proliferation of password entry errors. This drawback can be further compounded when the indicator of the mode currently active while the user is entering masked data is not clearly displayed. For example, the current mode indicator (assuming it is visible at all) may be located away from the input field and outside of the user's area of attention (positioned at a corner of the screen, for example).

Similar drawbacks also arise in more conventional devices which include full keyboards (e.g. a QWERTY keyboard) combined with a single-tap entry method As discussed above, in these cases the character being entered is completely invisible and is typically replaced immediately with an asterisk. Due to the low quality of some keypads as well as their small size, especially on handheld devices, the probability that a wrong key is depressed, two keys depressed at once or the same key depressed twice can be quite high (meaning that instances with respect to which there will be an incorrect sequence entry will occur at an undesirable frequency). Additionally, features such as initial letter capitalization (or "title mode") can be defaulted to on even for some full keyboard devices.

SUMMARY OF THE INVENTION

According to one example embodiment, there is provided a method for viewer restriction of a series of characters displayed on a screen rendered on a display of a mobile device, the series of characters composed by input operation of a subset of a plurality of keys of the mobile device. The method comprises the acts of receiving the series of characters during an entry period, the series of character forming a character string, the entry period comprised of at least one activity period during which the character string is displayed and one inactivity period during which the character string is obscured, detecting an inactivity event during the at least one activity period, the activity period ending when the inactivity event has been detected and detecting an activity event during the at least one inactivity period, the inactivity period ending when the activity event has been detected.

Also, there is provided an article of manufacture comprising at least one computer readable medium storing computer code that can be utilized to satisfy the acts of the above method.

There is also provided an electronic communications device comprising a plurality of keys, a display and a screen rendered on the display upon which a series of characters are adapted to be displayed, the series of characters forming a character string and composed by input operation of a subset of the plurality of keys, and a processor for implementing at least one module that includes at least one security component, the module for i) receiving the series of characters during an entry period, the series of characters forming a character string, the entry period comprised of at least one activity period during which the character string is displayed and one inactivity period during which the character string is obscured, ii) detecting an inactivity event during the at least one activity period, the activity period ending when the inactivity event has been detected and iii) detecting an activity event during the at least one inactivity period, the inactivity period ending when the activity event has been detected.

BRIEF DESCRIPTION OF THE FIGURES

Reference will now be made, by way of example, to the accompanying drawings:

FIG. 4 shows, in flow chart form, a method for the display of sensitive data in accordance with example embodiments.

Similar or the same reference numerals may have been used in different figures to denote similar compounds.

DETAILED DESCRIPTION OF THE ILLUSTRATIVE EMBODIMENT

Figure 1A:
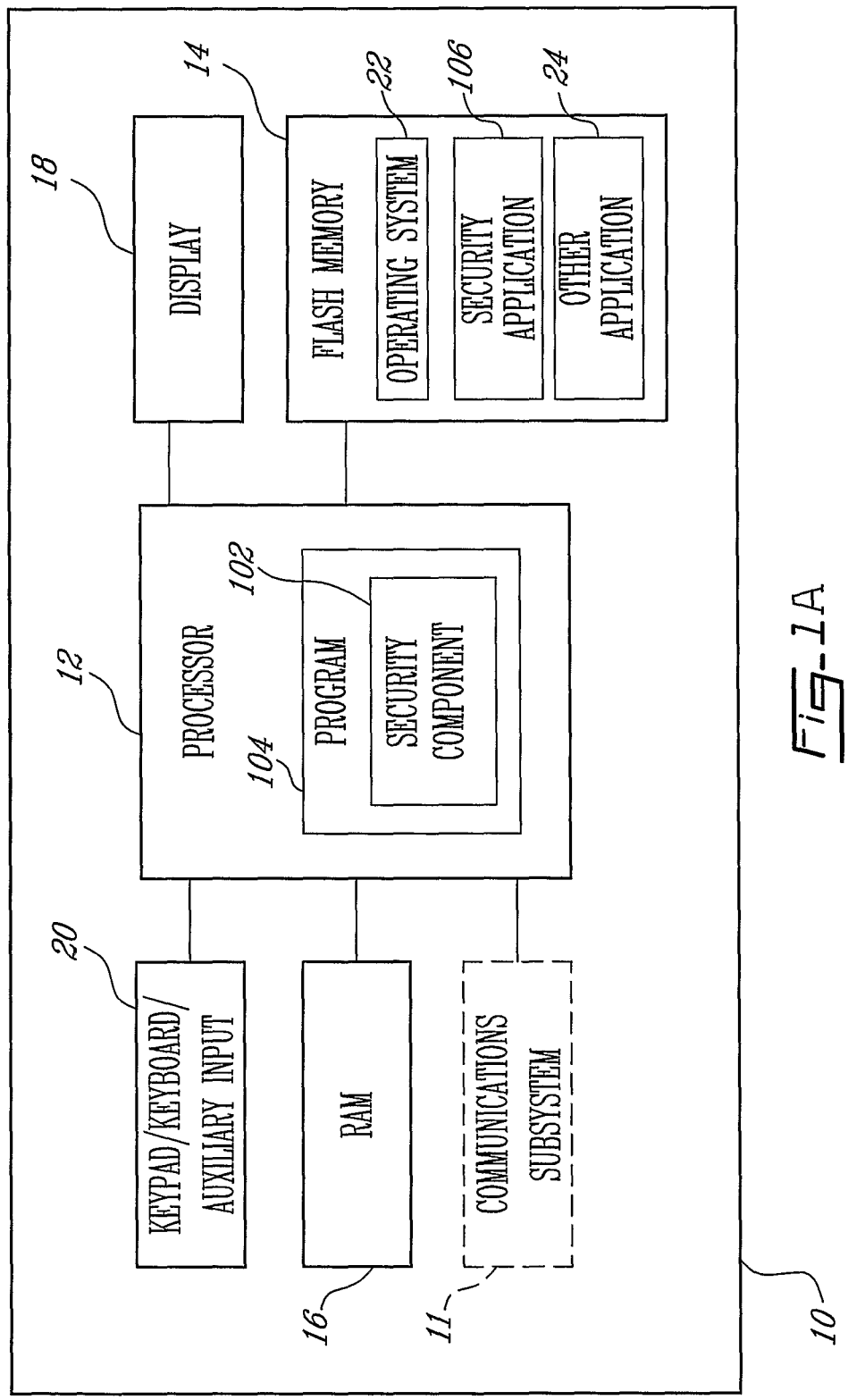
FIG. 1A shows a block diagram of a mobile device to which example embodiments can be applied.

Referring now to FIG. 1A, a mobile device, generally referred to using the reference numeral 10, will now be described. In some examples, the mobile device 10 is a two-way device having data and possibly also voice communication capabilities. In an example embodiment, the device 10 has the capability to exchange messages with other devices and communication systems on the Internet. Depending on the functionality provided by the device 10, in various embodiments the device may be a data communications device, multi-mode communications device configured for both data and voice communication, a mobile telephone, a Personal Digital Assistant (PDA), among other things.

The device 10 optionally includes a wireless communications subsystem 11 for enabling communications over one or more communication networks including, for example, cellular type wide area wireless networks and/or wireless local area networks (LANs). The device 10 also includes a microprocessor 12 that controls the overall operation of the device. The microprocessor 12 interacts with the communications subsystem 11 and also interacts with further device subsystems such as flash memory 14, random access memory (RAM) 16, display 18 upon which a screen, or screens, is rendered, and user input devices 20 such as a keyboard or keypad, auxiliary on-screen navigation input devices such as a touch screen, mini-joystick, touch pad or thumbwheel. In some embodiments, the device 10 can include communication subsystems for communication with a network device over a fixed link, for example, over a USB link or an Ethernet link (not shown).

Operating system software 22 and various software applications used by the microprocessor 12 are, in one example embodiment, stored in a persistent store such as the flash memory 14 or similar storage element. Those skilled in the art will appreciate that the operating system 22, other software applications 24, or parts thereof, may be temporarily loaded into a volatile store such as the RAM 16.

The microprocessor 12, in addition to its operating system functions, can enable execution of software applications on the device. A predetermined set of software applications which control basic device operations, including data and voice communication applications, for example, will normally be installed on the device 10.

Figure 1B:
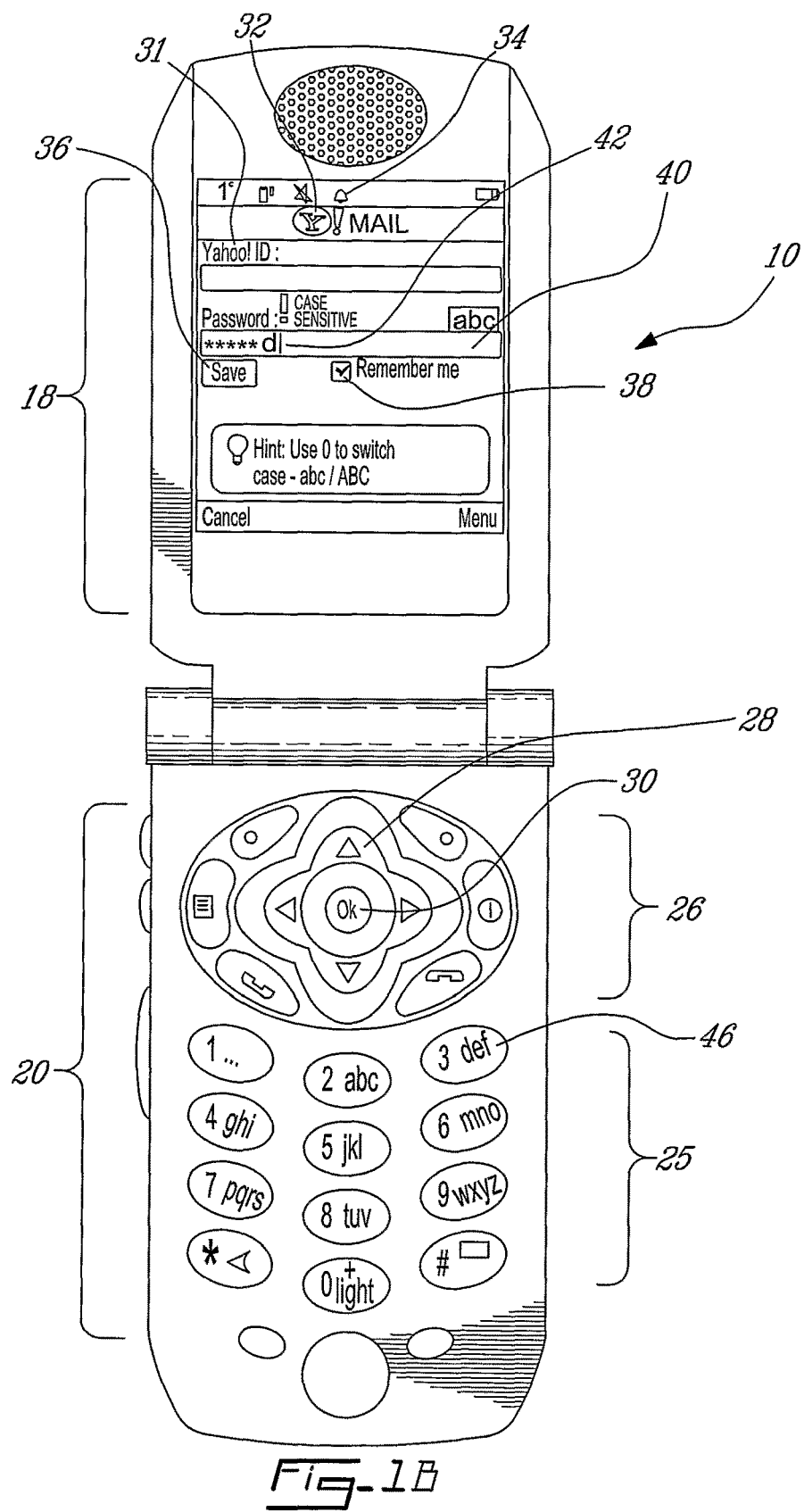
FIG. 1B is a front plan view of an example of the mobile device of FIG. 1A.

One of possible examples of the mobile device 10 is shown in FIG. 1B. Although the illustrated device is a flip-style device, the housing of the mobile device 10 does not impact the invention. In some examples the mobile device 10 will have a unitary housing, or have a housing comprised of two sliding portions, for instance.

The example mobile device 10, illustrated in FIG. 1B, is comprised of a set of device keys 20, illustratively comprised of a twelve (12) key, numeric keypad 25 and an additional function keypad 26, which can include, for example, four-way navigation keys 28 surrounding a center select 30, soft-keys, application-keys, edit and clear keys, send & end keys, multimedia keys, etc.

Still with particular reference to FIG. 1B, the illustrated mobile device 10 is additionally equipped with the display 18 such as, for example, an active matrix color display, upon which a screen can be rendered for displaying locally stored data such as contact lists, call logs, configuration settings, etc., as well as web pages, e-mail, etc. As known in the art, the display 18 and the associated software including the operating system 22 provide the interaction and display capabilities which allow a user to interact with the device 10 as well as other devices interconnected with the device 10 via a communications link, such as web servers, e-mail servers, etc. The display 18 typically supports the formatted presentation of screens of information in a variety of forms including text strings 31, graphics/pictures 32 and icons 34. Additionally, the information is typically displayed along with one or more control objects such as, for example, buttons 36, check boxes 38, sliders (not shown) and edit boxes 40, which allow the user to manipulate or otherwise interact with the displayed information. Typically, using, for example, the four-way navigation keys 28 to control a cursor 42, the user can migrate (shift focus) between, and interact with the control objects as well as shift focus between the screen of a current application and the screen of another application.

Still referring to FIG. 1B, when the user has migrated to an edit box (or input field) as in 40, the user can input data, such as alphanumeric characters using, for example, the twelve (12) key numeric keypad 25 and the multi-tap character input method as described hereinabove.

Figure 2A:
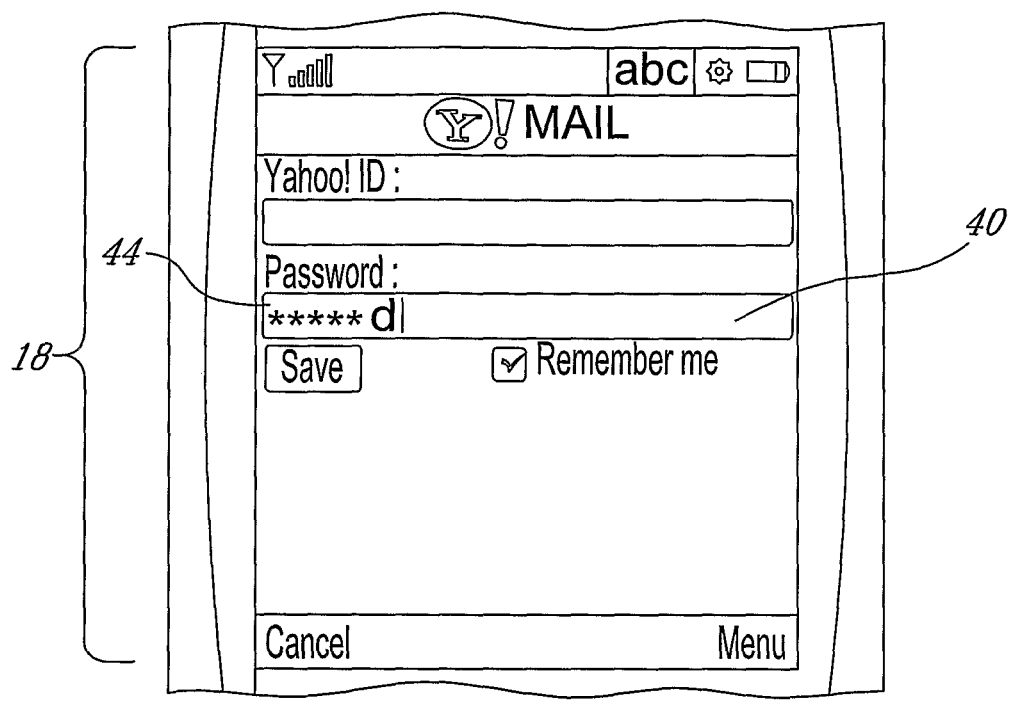
FIGS. 2A through 2C show example screen shots for the display of the device of FIG. 1B, the screen shots illustrating a method for display of sensitive data according to the prior art.
Figure 2B:
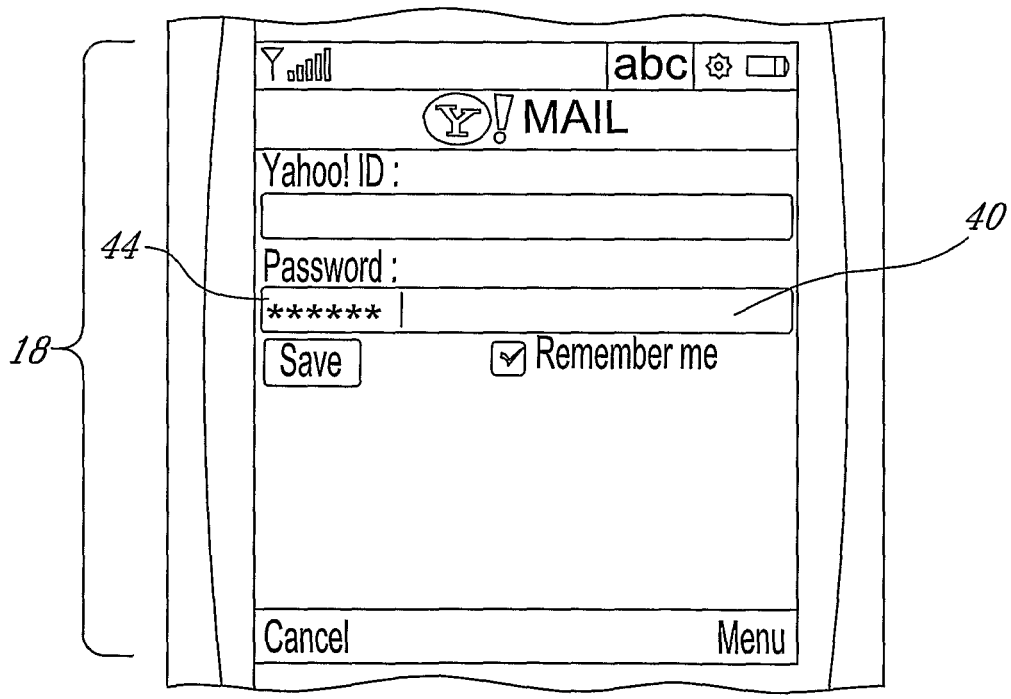
Figure 2C:
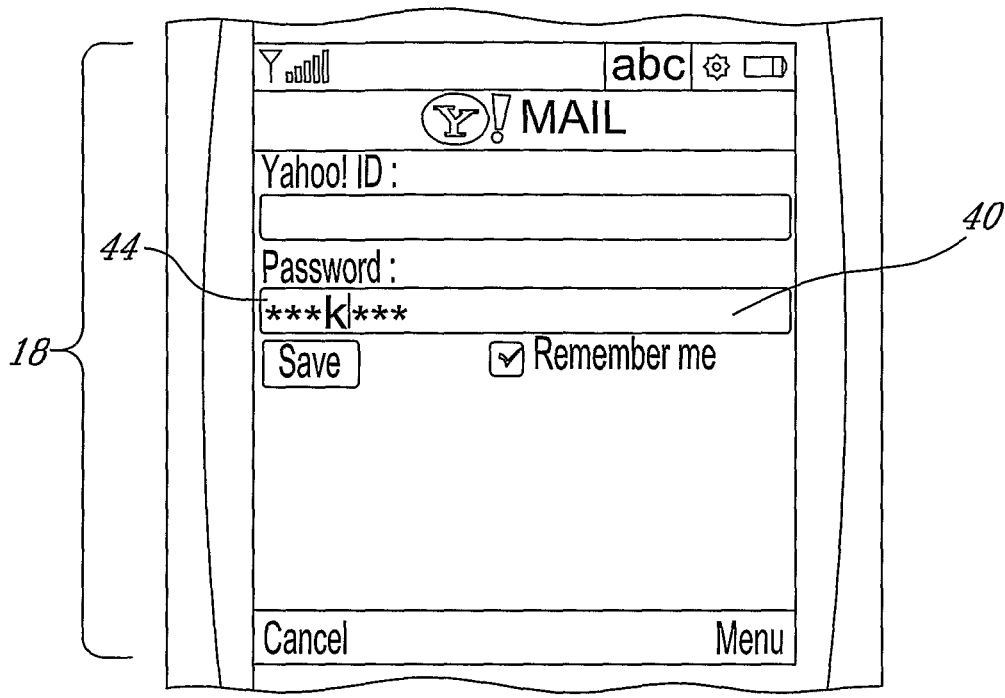

Referring now to FIGS. 2A through 2C and further to what has been previously discussed, one example prior art method for entering sensitive strings (such as passwords) involves, as the characters are composed, making them visible to the user in clear text. Once the wished for character has been composed and seized by the device, the character is concealed by replacing it with an asterisk. For example, in FIG. 2A, the character "d" has been added to a character string 44 into the input field 40 using the multi-tap method by pressing numeric Key "3" (reference 46 in FIG. 1B) once.

Referring now to FIG. 2B, after a shortly delay (as previously mentioned, this can be one second, for example) the character is seized and concealed with an asterisk. This example prior art method allows the user to delete characters already seized and concealed. This might be carried out by, for example, using a backspace key to backspace for example by backspacing over the character. As another example, this might be carried out by using the left key of the navigation keys 28 to back up the cursor over the character to be deleted, followed by depression of the space key. Additionally, and referring now to FIG. 2C, the example prior art method also allows for the insertion of additional characters at any point within the character string 44 by use of left or right key of the navigation keys 28 to reposition the cursor; however the other characters remain concealed behind an asterisk.

Figure 3A:
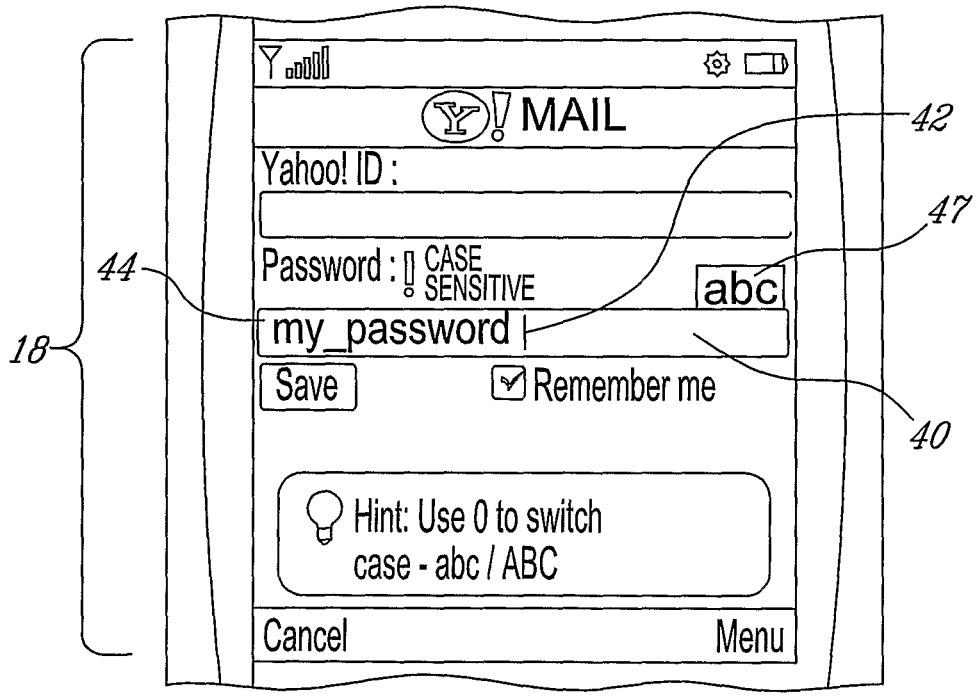
FIGS. 3A through 3E show example screen shots for the display of the device of FIG. 1B, the screen shots illustrating a method for the display of sensitive data according to an example embodiment.

An example prior art method for entering sensitive strings having been described, FIGS. 3A-3E illustrate a method for the display of sensitive data according to at least one example embodiment (a more generic description of a method for the display of sensitive data in accordance with example embodiments will be described later). Referring now to FIG. 3A, the user begins by entering the sensitive character string 44, for example using the twelve (12) key numeric keypad 25 and the multi-tap character input method as described hereinabove.

However, instead of obscuring each character immediately following its composition, the characters of the entire sensitive character string 44 remain visible during its composition. The character string 44 is only concealed on completion of its composition or following an inactivity event, which can be indicated to the device 10 by the user in a number of ways, for example the user does not press any key for a configurable short period of time (for example 3 seconds) or the user moves focus away from the input field 40 in question (for example by moving the cursor 42 to another input field or control object by, for instance, activation of the navigation keys 28).

Figure 3B:
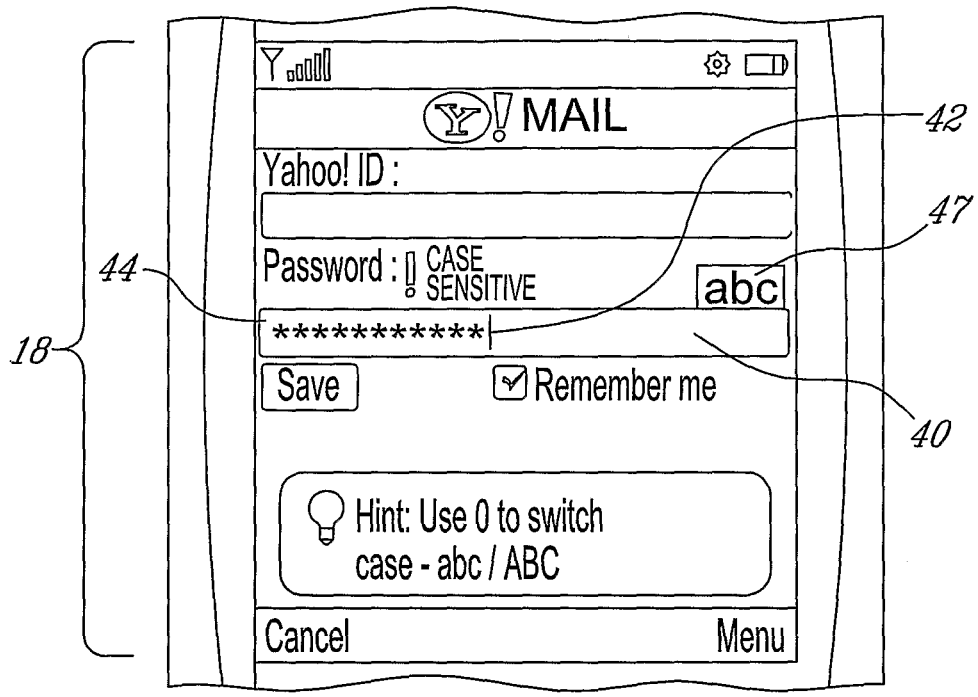
Figure 3C:
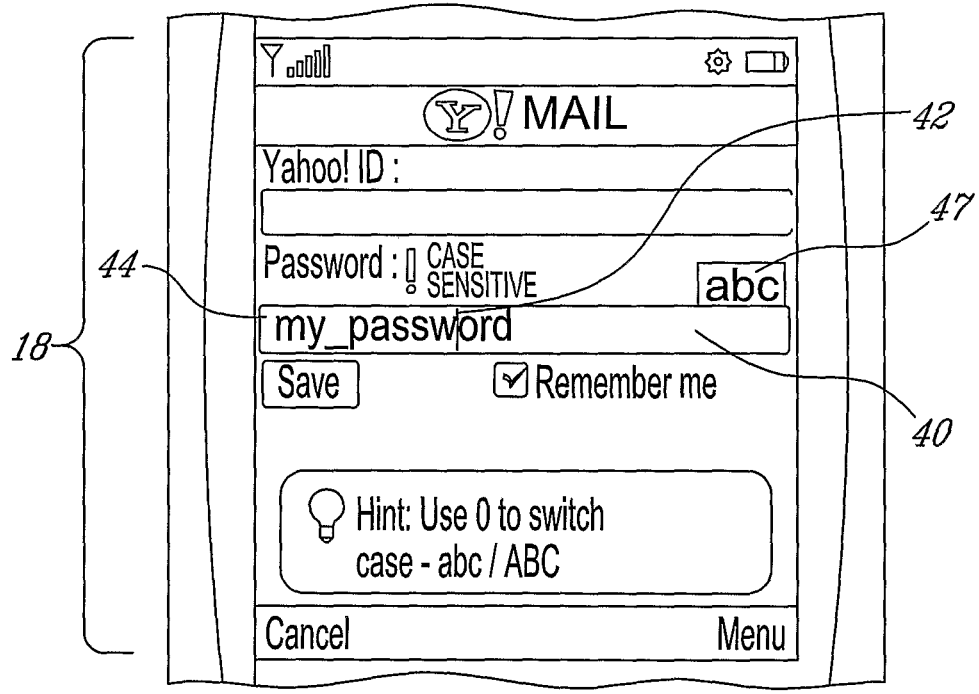
Figure 3D:
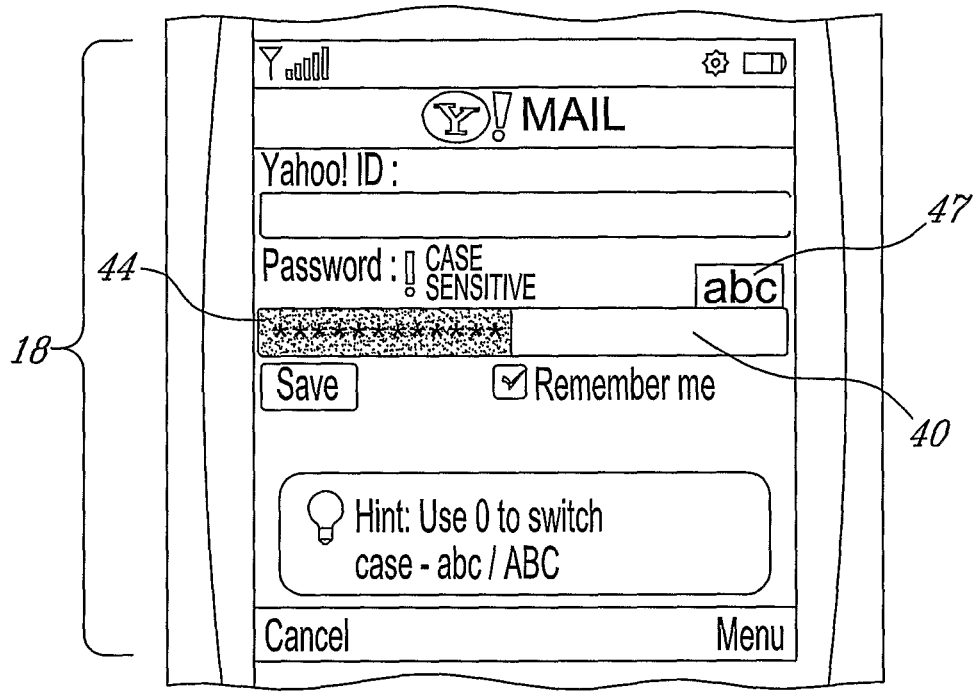

Referring now to FIG. 3B, following obscuring or masking of the character string 44, the user may reveal the obscured character string 44 by performing an additional action which gives rise to an activity event within an allotted period of time (for example 60 seconds). Examples of additional actions include, for example, the user attempting to add an additional character to the character string 44 already entered or the user returning focus to the input field 40 and positioning the cursor 42 left or right of the concealed characters by, for example, activation of the right or left key of the navigation keys 28. Referring now to FIG. 3C, at this point the concealed character string 44 is revealed and the user is free to move the cursor 42 to the position where the desired changes are to be made.

In some examples, when the user fails to reveal the obscured or masked character string 44 within the allotted period of time, the obscured or masked character string becomes permanently concealed and remains so, even if the user attempts to add an additional character to the string or returns focus to the input field 40. This can provide for additional protection against the sensitive character 42 being compromised.

The described method also foresees a number of other features which may prove opportune in a given implementation. For example, if the input field 40 is for entering a password and the password entered into input field 40 is used successfully, or the user selects that the entered password should be saved, for example, the input field becomes non-editable (i.e locked) and permanently concealed. Additionally, and referring to FIG. 3D, if the user returns focus to the input field 40, the entire concealed character string 42 is selected and the cursor is not displayed. Of note, however, is that in a particular implementation there may be a number of instances where moving the focus away from the input field 40 will not result in the input field 40 becoming un-editable once focus is returned to the input field 40, for example when the cursor is moving around the current screen rendered on the display, or when a child screen is accessed.

Figure 3E:
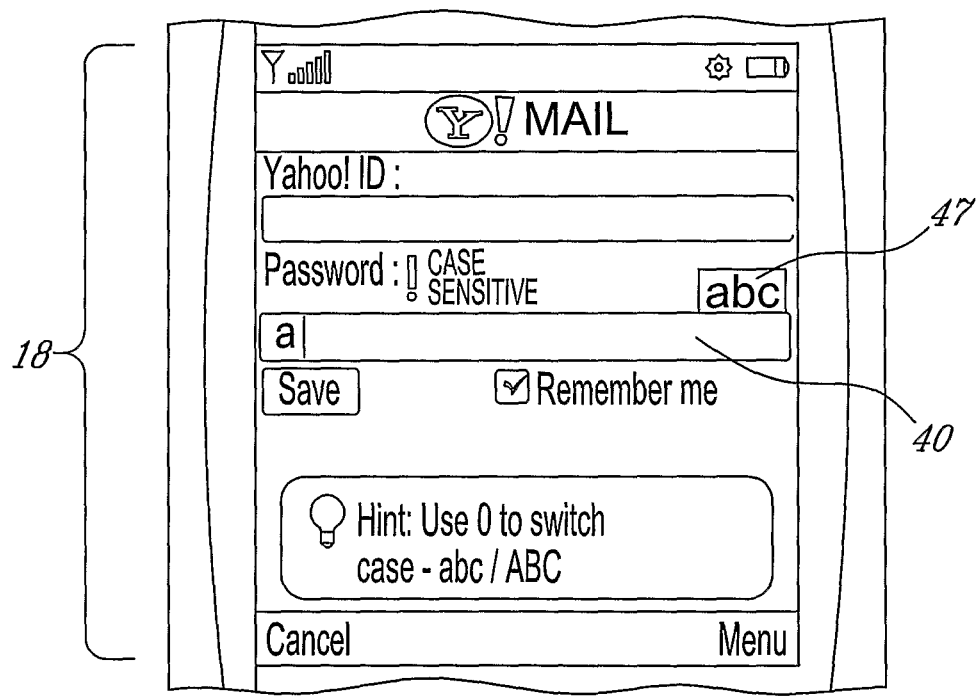

Referring now to FIG. 3E, attempted entry of characters into the input field 40 at this point, or depression of the delete key, results in the concealed character string 44 being erased. Additionally, in order to provide the user with an indication of the current status of the input field, an indicator 47 as to the entry mode currently active for the input field 40 may be provided for. (In the illustrated example, the input mode is lowercase multi-tap mode as indicated by the letters 'abc' that are in lower case.) Furthermore, as many of the parameters used in support of the method as described herein are configurable, a specific entry mode to the input field 40, for example in order to provide the user with a familiar context over time for entry of sensitive data such as passwords, can be a pre-configured default or can be based on a user's previous configuration.

It will be understood that the mentioning herein (or showing in the drawings) of certain specific details of illustrative examples should not be taken as an intent to limit the scope of the invention. For example, although FIGS. 2A through 2C and FIGS. 3A through 3E illustrate sensitive character string concealment or masking within one particular type of application (e-mail application), software and methods in accordance with example embodiments are not limited to any particular type or category of application. Some examples of applications and systems where sensitive character string concealment might occur include the various types of applications and systems that process/relate to financial data, contact/phone number details, media files, documents, messaging, etc.

With reference now to FIG. 4, there is illustrated a flow chart representation of a process 100 for the display of sensitive data in accordance with example embodiments. The process 100 can be implemented at least in part by a security component 102 (FIG. 1A) that in an example embodiment is part of a program 104 implemented by the microprocessor 12 under instruction of computer code of security application 106, the operating system 22, or one of the other applications 24, for example. Various alternatives will be apparent to one skilled in the art. For example, all or parts of the functionality of the security component 102 may alternatively be implemented as a stand-alone application that is called on by the program 104.

In the illustrated process 100, the process 100 makes a determination as to whether the user of the device 10 has entered a character (decision 114). As previously mentioned, a number of different possible ways in which a character might be entered are contemplated In at least one example, a device user composes a character by input operation of a particular one of the numeric keys on the device 10 one or more predetermined number of times (more than once if the desired letter is the second or third sequential letter associated with the particular numeric key). In at least one other example, where the device 10 includes a full keyboard (for instance, some Blackberry® models) the device user composes a character by input operation of the Key on the Keyboard of the device 10 corresponding to that character. It will be appreciated by those skilled in the art that other example ways of character entry exist, depending upon the particular device 10 within which the process 100 is implemented.

If a character was entered, at 116 the entered character is displayed within (and as part of) a sensitive character string (in some examples, the sensitive character string is a password character string). As shown and described in previous illustrated examples, the sensitive character string can be shown within an input field displayed on the device 10, for instance. At this stage in the process 100, the sensitive character string (including the entered character) is visible in clear text.

At decision 118 which follows the 116 (and the 'No' branch of the decision 114) the process 100 makes a determination as to whether inactivity has been detected. Any one or more of a variety of events are contemplated for indicating inactivity. As one example, inactivity could be indicated when no key of the device 10 is pressed within a short period of time, illustratively at least three (3) seconds. As another example, inactivity could be indicated when focus is moved away from the sensitive character string input field to another part of the screen.

It inactivity is detected, the sensitive character string is concealed at 120. Subsequently, at 122, if activity as again detected, for example a key is depressed or focus is moved back to the sensitive character string input field within a short period of time, as will be seen below illustratively within about sixty (60) seconds, the sensitive character string is displayed at reveal string 124. If no activity has been detected (the "No" branch of decision 122) completion of composition events can be detected at decision block 126. If no completion of composition event is detected, the sensitive character string remains concealed. However, if a composition completion event has occurred the sensitive character string is concealed permanently at 128.

In this regard, a composition completion event can be provided by the expiration of a certain time delay since the last key was pressed or the process has become inactive. Alternatively, a composition completion event could be provided via a positive indication on behalf of the user that composition of the character string has been completed, for example by selecting an appropriate button or the like. Additionally, a composition completion event could be when the focus is moved away from the current screen to another screen, for example by switching to another application or process.

As mentioned previously, typically wildcard characters (such as, for example, asterisks) are used to conceal the sensitive character string; however one skilled in the art will appreciate that other ways of concealing the sensitive character string are possible. For example, the entire sensitive character string input field could be made hidden (disappear from display).

This disclosure's description of example embodiments of the invention does not limit implementation to any particular computer programming language or system architecture. Embodiments of the present invention are not limited to any particular operating system, mobile device architecture, or computer programming language.

Certain adaptations and modifications of the describes embodiments can be made. Therefore, the above-discussed embodiments are considered to be illustrative and not restrictive.

What is claimed is:

1. A method comprising:
   causing display of an input field;
   receiving input indicating a character string during an entry period, the character string composed by input operation of a subset of a plurality of keys of a mobile device, said entry period comprised of at least one activity period during which a plurality of characters of the character string are displayed in an unobscured form in the input field and at least one inactivity period during which the plurality of characters of the character string are displayed in an obscured form in the input field, wherein the plurality of characters are the characters of the entire string which have been entered and wherein the entire string is lengthened as additional characters are entered in the input field such that the entire string including newly entered characters are unobscured in the input field during the activity period;
   detecting an inactivity event during said at least one activity period, said activity period ending when said inactivity event has been detected, and, in response to detecting the inactivity event, causing the plurality of characters to be displayed in an obscured form;
   detecting an activity event during said at least one inactivity period, said inactivity period ending when said activity event has been detected, and, in response to detecting the activity event, causing the plurality of characters to be displayed in an unobscured form;
   detecting a completion of composition event, said entry period ending when said composition completion event has been detected; and
   causing the character string to be concealed permanently and the input field to be non-editable after said entry period ends.

2. The method of claim 1, wherein said character string is a password.

3. The method of claim 1, wherein the plurality of keys comprises twelve numeric keys and each character of the plurality of characters is composed by input operation of a particular one of said numeric keys one or more predetermined number of times, a delay between successive input operations being less than a predetermined limit.

4. The method of claim 3, wherein said predetermined limit is at least one second.

5. The method of claim 1, wherein each character of said character string is displayed promptly following its composition.

6. The method of claim 1, wherein said input field is a text edit field.

7. The method of claim 1, wherein said inactivity event occurs when a user of the device moves focus away from said input field during said activity period.

8. The method of claim 7, wherein said activity event occurs when a user of the device moves focus back to said input field during said entry period.

9. The method of claim 1, wherein said inactivity event occurs when a user of the device fails to operate one of the subset of the plurality of keys during an allotted period of time during said activity period.

10. The method of claim 9, wherein said allotted period of time is at least 3 seconds.

11. The method of claim 1, wherein said composition completion event occurs when a user of the device moves focus away from a display.

12. The method of claim 1, wherein said activity event occurs when a user of the device operates one of the subset of the plurality of keys during said inactivity period.

13. The method of claim 1, wherein said composition completion event occurs when said inactivity period exceeds an allotted period of time.

14. The method of claim 13, wherein said allotted period of time is at least 60 seconds.

15. The method of claim 1, wherein said composition completion event occurs when a user selects to complete composition.

16. The method of claim 1, further comprising causing said character string to be overwritten when one of the subset of the plurality of keys is operated within an allotted period of time following said composition completion event.

17. The method of claim 1, wherein causing said character string to be concealed permanently comprises causing each character of said character string to be masked using a wildcard.

18. The method of claim 1, wherein said character string is obscured by masking each character of said character string using a wildcard.

19. The method of claim 1, wherein, in response to detecting the activity period, causing the plurality of characters to be displayed in unobscured form comprises, in response to detecting the activity period, causing modification of display of at least one character from the obscured form to the unobscured form.

20. The method of claim 1, wherein detecting the activity period comprises receiving input indicating at least one additional character, and wherein, in response to detecting the activity period, causing the plurality of characters to be displayed in unobscured form comprises, in response to detecting the activity period, causing the plurality of characters and the at least one additional character to be displayed in unobscured form.

21. An apparatus comprising a processor and a memory storing computer program code, wherein the memory and stored computer program code are configured, with the processor, to cause the apparatus to:
    display an input field;
    receive input indicating a character string during an entry period, the character string composed by input operation of a subset of a plurality of keys of a mobile device, said entry period comprised of at least one activity period during which a plurality of characters of the character string are displayed in an unobscured form in the input field and at least one inactivity period during which the plurality of characters of the character string are displayed in an obscured form in the input field, wherein the plurality of characters are the characters of the entire string which have been entered and wherein the entire string is lengthened as additional characters are entered in the input field such that the entire string including newly entered characters are unobscured in the input field during the activity period;
    detect an inactivity event during said at least one activity period, said activity period ending when said inactivity event has been detected, and, in response to detecting the inactivity event, cause the plurality of characters to be displayed in an obscured form;
    detect an activity event during said at least one inactivity period, said inactivity period ending when said activity event has been detected, and, in response to detecting the activity event, cause the plurality of characters to be displayed in an unobscured form;
    detect a completion of composition event, said entry period ending when said composition completion event has been detected; and
    cause the character string to be concealed permanently and the input field to be non-editable after said entry period ends.

22. The apparatus of claim 21, wherein said character string is a password.

23. The apparatus of claim 21, wherein said plurality of keys comprises twelve numeric keys and each character of said plurality of characters is composed by input operation of a particular one of said numeric keys one or more predetermined number of times, a delay between successive input operations being less than a predetermined limit.

24. The apparatus of claim 23, wherein said predetermined limit is at least one second.

25. The apparatus of claim 21, wherein each character of said character string is displayed promptly following its composition.

26. The apparatus of claim 21, wherein said input field is a text edit field.

27. The apparatus of claim 21, wherein said inactivity event occurs when a user of the device moves focus away from said input field during said activity period.

28. The apparatus of claim 27, wherein said activity event occurs when a user of the device moves focus back to said input field during said entry period.

29. The apparatus of claim 21, wherein said composition completion event occurs when said inactivity period exceeds an allotted period of time.

30. The apparatus of claim 29, wherein said allotted period of time is at least 60 seconds.

31. The apparatus of claim 21, wherein said composition completion event occurs when a user selects to complete composition.

32. The apparatus of claim 21, wherein said composition completion event occurs when a user of the device moves focus away from a display.

33. The apparatus of claim 21, wherein said inactivity event occurs when a user of the device ceases character composition for a predetermined period of time during said activity period.

34. The apparatus of claim 33, wherein said predetermined period of time is at least three seconds.

35. The apparatus of claim 21, wherein said activity event occurs when a user of the device operates one of the subset of the plurality of keys during said inactivity period.

36. The apparatus of claim 21, wherein the memory and stored computer program code are further configured, with the processor, to cause the apparatus to cause said character string to be overwritten when one of the subset of the plurality of keys is operated following said composition completion event.

37. The apparatus of claim 21, wherein the memory and stored computer program code are further configured, with the processor, to cause the apparatus to cause said character string to be concealed permanently by causing each character of said character string to be masked using a wildcard.

38. The apparatus of claim 21, wherein said character string is obscured by masking each character of said character string using a wildcard.

* * * * *